United States Patent
De Santis et al.

(10) Patent No.: US 12,549,378 B2
(45) Date of Patent: *Feb. 10, 2026

(54) MONITORING SYSTEM FOR MONITORING HASH-BASED DIGITAL SIGNATURES

(71) Applicant: Siemens Aktiengesellschaft, Munich (DE)

(72) Inventors: Fabrizio De Santis, Munich (DE); Antonio Vaira, Munich (DE)

(73) Assignee: SIEMENS AKTIENGESELLSCHAFT, Monchen (DE)

( * ) Notice: Subject to any disclaimer, the term of this patent is extended or adjusted under 35 U.S.C. 154(b) by 81 days.

This patent is subject to a terminal disclaimer.

(21) Appl. No.: 18/282,900

(22) PCT Filed: Mar. 7, 2022

(86) PCT No.: PCT/EP2022/055743
§ 371 (c)(1),
(2) Date: Sep. 19, 2023

(87) PCT Pub. No.: WO2022/207243
PCT Pub. Date: Oct. 6, 2022

(65) Prior Publication Data
US 2024/0179010 A1    May 30, 2024

(30) Foreign Application Priority Data

Mar. 31, 2021  (EP) .................... 21166285

(51) Int. Cl.
*H04L 29/06*   (2006.01)
*H04L 9/30*    (2006.01)
*H04L 9/32*    (2006.01)

(52) U.S. Cl.
CPC ............. *H04L 9/3247* (2013.01); *H04L 9/30* (2013.01); *H04L 9/3239* (2013.01)

(58) Field of Classification Search
CPC ......... H04L 9/006; H04L 9/30; H04L 9/3006; H04L 9/3013; H04L 9/302; H04L 9/3066; H04L 9/3247; H04L 9/3239
See application file for complete search history.

(56) References Cited

U.S. PATENT DOCUMENTS

| | | | |
|---|---|---|---|
| 10,581,616 B1 | 3/2020 | Paruzel | |
| 2015/0254267 A1* | 9/2015 | Berg | G06F 16/215 707/692 |

(Continued)

OTHER PUBLICATIONS

D. McGrew—Leighton-Micali Hash-Based Signatures—Request for Comments; RFC 8554; https://www.rfc-editor.org/pdfrfc/rfc8554.txt.pdf retrieved Mar. 31, 2021.

(Continued)

*Primary Examiner* — Malcolm Cribbs
(74) *Attorney, Agent, or Firm* — Schmeiser, Olsen & Watts LLP

(57) ABSTRACT

A monitoring system including a requesting device, a monitoring apparatus and a signing device, wherein the monitoring apparatus is configured to receive a signature request data structure, store the data, receive a hash-based digital signature generated for the data by a stateful hash-based cryptographic function of the signing device, extract a one-time signature from the received hash-based digital signature, determine a one-time public key based on the stored data to be signed and the one-time signature, compare the one-time public key with previous one-time public keys determined from hash-based digital signatures previously received from the signing device, and if the one-time public key is different to any of previous one-time public keys, store the one-time public key in a data storage unit, if the one-time public key is equal to at least one of the previous one-time public keys, output a first warning signal to the requesting device.

15 Claims, 3 Drawing Sheets

(56) References Cited

U.S. PATENT DOCUMENTS

Figure 1:
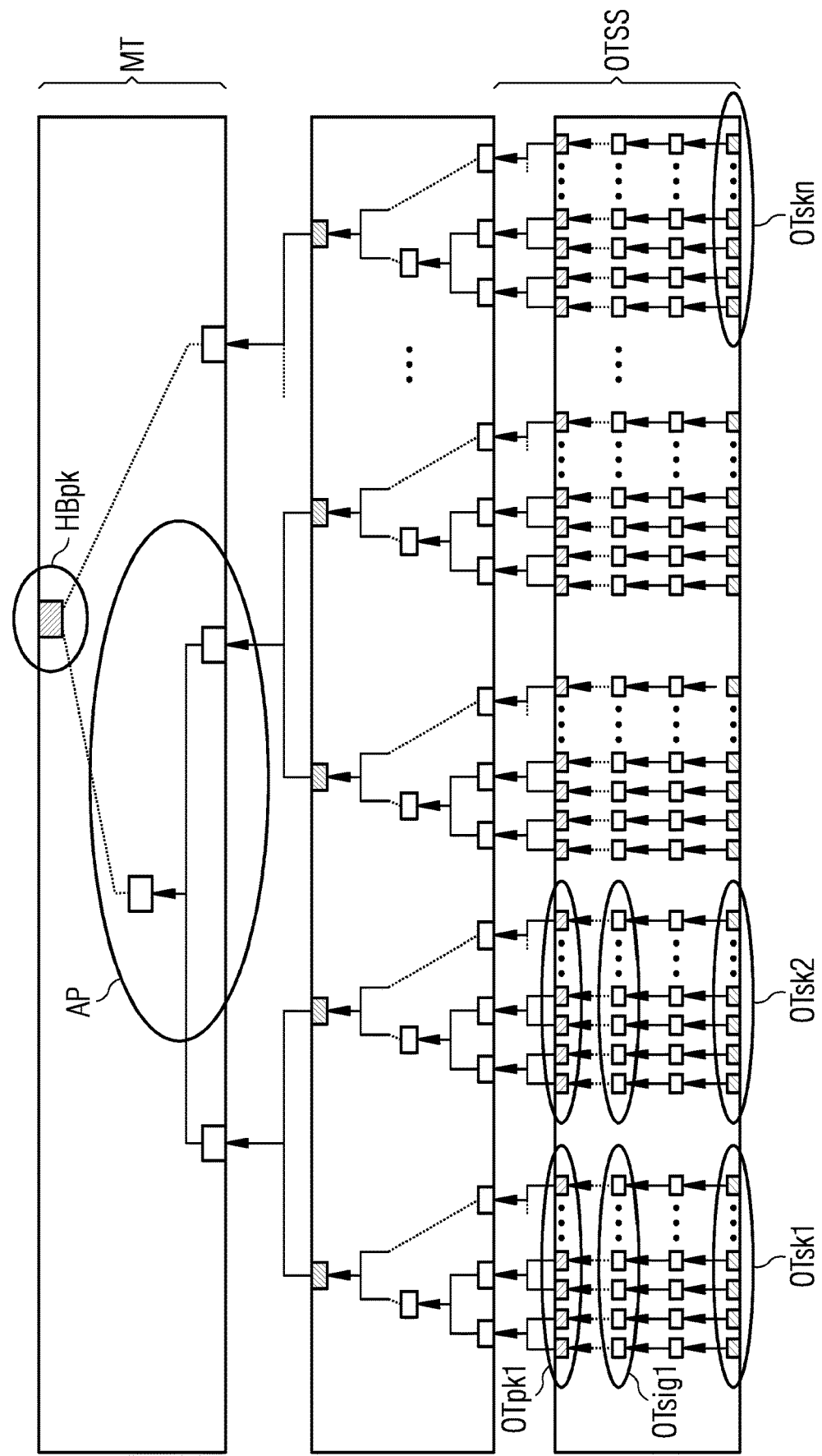

| | | | |
|---|---|---|---|
| 2016/0080156 A1 | 3/2016 | Kaliski, Jr. | |
| 2019/0149331 A1* | 5/2019 | Gross | H04L 9/0869 380/30 |
| 2019/0319782 A1 | 10/2019 | Ghosh et al. | |
| 2020/0028679 A1* | 1/2020 | Chumbley | H04L 9/0894 |

OTHER PUBLICATIONS

A. Huelsing—XMSS: extended Merkle Signature Scheme—Request for Comments; RFC 8391; https://www.rfc-editor.org/pdfrfc/rfc8391.txt.pdf retrieved Mar. 31, 2021.
Santosh, Ghosh et al: "Lightweight Post-Quantum-Secure Digital Signature Approach for IoT Motes", IACR, International Association for Cryptologic Research; Relevant to clair No. 1-15, vol. 20190213:033538, Feb. 7, 2019 (Feb. 7, 2019), pp. 1-23, XP061031800.
Cooper, a David et al.: "Recommendation for Stateful Hash-Based Signature Schemes NIST SP 800-208"; NIST, National Institute of Standards and Technology (NIST); Oct. 28, 2020 (Oct. 28, 2020), pp. 1-59, XP061057777.
Buchmann, Johannes et al.: "XMSS—A Practical Forward Secure Signature Scheme Based on Minimal Security Assumptions"; Dec. 2, 2011 (Dec. 2, 2011); ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg; pp. 117-1; XP047375884.
PCT International Search Report and Written Opinion of International Searching Authority mailed Jun. 30, 2022 corresponding to PCT International Application No. PCT/EP2022/055743 filed Mar. 7, 2022.

* cited by examiner

MONITORING SYSTEM FOR MONITORING HASH-BASED DIGITAL SIGNATURES

CROSS-REFERENCE TO RELATED APPLICATIONS

This application claims priority to PCT Application No. PCT/EP2022/055743, having a filing date of Mar. 7, 2022, which claims priority to European Application No. 21166285.3, having a filing date of Mar. 31, 2021, the entire contents both of which are hereby incorporated by reference.

FIELD OF TECHNOLOGY

The following relates to a method and monitoring system for monitoring hash-based digital signatures comprising a requesting device, a monitoring apparatus and a stateful hash-based cryptographic device.

BACKGROUND

Nowadays, internet of things (IoT) devices are increasingly applied in private and industrial environments. IoT devices communicate with each other or with controllers in public or private communication networks. Public-key cryptography is used to secure authenticity of communication partners and integrity of the exchanged data. Digital signatures are applied in device certificate to provide counterfeit protection. Therefore, the digital signatures need to provide protection over the whole lifetime of the device, which can extend up to 10 to 20 years in industrial environment. Respectively public-key cryptography schemes are required, which are still secure in 10 or 20 years.

Public-key cryptography refers to cryptosystems which employ key-pairs instead of individual secret keys. A key pair consist of a private key, which is only known to its owner, and a public key, which can be distributed publicly to anybody without compromising the security of the cryptosystem.

Digital signatures are an example of public-key cryptography, in which a message is signed using the sender's private key and can be verified by anyone having access to the corresponding sender's public key. Two widely employed approaches to public-key cryptography are RSA (Rivest-Shamir-Adleman) and elliptic-curve cryptography. These cryptosystems are based on the RSA problem and the elliptic-curve discrete logarithm problem, respectively. So far, no efficient methods are known to solve such problems using current computing technologies. This means that for sufficiently large numbers the task of solving such problems is believed to be impossible with conventional computers. However, efficient quantum algorithms (e.g., Shor's algorithm) are known to solve such problems with the aid of quantum computers. This means that as soon as powerful enough quantum computers are built in the future, the security of RSA and elliptic-curve cryptographic systems will become at risk of compromise.

Post-quantum cryptography generally refers to a class of public-key cryptographic algorithms for which no efficient quantum and non-quantum algorithms are known to solve the underlying math problems. One way of realizing post-quantum digital signatures is to employ stateful hash-based signatures algorithms. Any stateful hash-based signature schemes are built upon One-Time-Signature and Merkle hash trees.

One example of a stateful hash-based signature algorithm is eXtended Merkle Signature Scheme (XMNSS), which builds upon Winterniz One-Time Signatures+ (WOTS+) and Merkle trees. The Leighton-Micali Signature (LMS) scheme is another approach to hash-based signatures described in the RFC 8554. XMSS and LMS are stateful algorithms, meaning that, unlike conventional digital signature schemes like Digital Signature Algorithm (DSA) or Elliptic Curve Digital Signature Algorithm (ECDSA), an internal state must be maintained and updated after every signature to guarantee the correct functioning and security of the digital signature system: it must be ensured that no WOTS+ secret key is used more than once. Using the same WOTS+ secret key more than once implies a security breach.

For the user of a stateful hash-based signature, i.e., verifier, there is no way to check if an entity generating the stateful hash-based signature, i.e., a signer, is behaving correctly.

SUMMARY

An aspect relates to a monitoring system and method that enables a user of of a stateful hash-based signature to identify a security breach of a hash-based signature, e.g., a key re-usage attack or a malfunction of the signer.

A first aspect concerns a monitoring system for monitoring hash-based digital signatures comprising a requesting device, a monitoring apparatus and signing device, wherein the monitoring apparatus is configured to
- receive a signature request data structure comprising data to be digitally signed from the requesting device,
- store the data to be signed,
- receive a hash-based digital signature generated for the data to be signed by a stateful hash-based cryptographic function of the signing device,
- extract a one-time signature from the received hash-based digital signature,
- determine a one-time public key based on the stored data to be signed and the one-time signature,
- compare the one-time public key with previous one-time public keys determined from hash-based digital signatures previously received from the signing device, and
- if the one-time public key is different to any of previous one-time public keys, store the one-time public key in a data storage unit and forward the hash-based digital signature received to the requesting device, and
if the one-time public key is equal to at least one of the previous one-time public keys, output a first warning signal to the requesting device.

Based on the observation that one-time private keys are uniquely tied to their corresponding one-time public keys, one-time public keys are uniquely tied to one-time signatures, and one-time signatures are included within the corresponding stateful hash-based signatures, and since one-time public keys can be computed out of one-time signatures, it is possible to indirectly verify if one-time private keys were used multiple times by verifying if one-time public keys have been seen already. The monitoring apparatus of the monitoring system monitors the signature request data structured and in return provides hash-based signature between the signature requesting device and the signing device. This monitoring is fully transparent from the perspective of both the signing device and the requesting device. Therefore, no adaptions are required, neither in the requesting device nor in the signing device. Based on the first warning signal the requesting apparatus is informed on the security breach and can take counteractions, e.g., abort the signing process or request a new hash-based signature.

In a further embodiment of the monitoring system, the hash-based digital signature is blocked and not forwarded to the requesting device, if the one-time public key is equal to any of the previous public keys.

The requesting device does not receive a malicious digital signature and cannot be corrupted by a key re-usage attack. Avoiding one-time private key re-usage is fundamental to guarantee the security of the signature system.

In a further embodiment of the monitoring system, the monitoring apparatus is configured to send a second warning signal to the signing device, if the one-time public key is equal to any of the previous public keys.

By that, the signing device is informed about its unexpected and erroneous behaviour and can take measures to recover from the error state.

In a further embodiment of the monitoring system, on receipt of the second warning signal, the signing device generates a further hash-based signature for the data to be signed.

The signing process is not interrupted by sending the further hash-based signature for the data to be signed and a delay is minimized for providing the hash-based signature to the requesting device.

In a further embodiment, the monitoring apparatus outputs the first warning signal to the requesting device, only if all further hash-based signatures of a predefined number of further hash-based signatures received for the data to be signed are equal to any of the previous one-time public keys.

With this embodiment a signing process can run without interruptions in case of a temporary failure and real malicious behaviors may be detected.

In a further embodiment of the monitoring apparatus, the data storage unit is protected with respect to data integrity.

This avoids corruption of the stored one-time public keys and ensures comparing the current one-time public key with correct previous one-time public keys.

In a further embodiment the monitoring apparatus stores additional meta-information of the signing request data structure and/or the meta-information of the hash-based digital signature.

This enables implementing further security checks on the monitoring apparatus.

In a further embodiment the monitoring apparatus forwards the signature request data structure to the signing device, and/or the monitoring apparatus forwards the hash-based digital signature received from the signing device to the requesting device.

This allows the monitoring device to directly block the transfer of the hash-based signature to the requesting device. The monitoring device can take over firewall function with respect to signature retrieval.

In a further embodiment of the monitoring system, the signature request data structure is provided to the signing device without passing the monitoring apparatus and the monitoring apparatus receives the data to be signed and the hash-based digital signature generated for the data to be signed from a transfer device.

This allows a centralized monitoring of the signature processes. The monitoring apparatus is not required to be in direct communication between the requesting device and the signing device.

In a further embodiment the monitoring apparatus and the requesting device are comprised in a first communication network and the signing device is comprised it a second communication network, wherein the first communication network is different from the second communication network.

The monitoring apparatus provides a gateway function towards the second network and the signing device. Any corruption of the signing device itself or influence of a corrupted second communication network on the signing device can be kept apart from the first network and the requesting device. The monitoring apparatus provides the first communication network with a possibility to verify the provided stateful hash-based digital signature located in a foreign network, i.e., the second communication network.

In a further embodiment the signing device initializes an internal state with respect to a set of one-time private keys of the stateful hash-based cryptographic function and generates a hash-based public key based on the initial internal state and provides the hash-based public key to verify the generated hash-based digital signature.

Each internal state of the stateful hash-based cryptographic function is therefore uniquely related to one one-time private key. The requesting device or a connected verifier unit can verify the integrity of the hash-based digital signature based on the provided hash-based public key.

In a further embodiment the stateful hash-based cryptographic function of the signing device is switched on when receiving a signature request data structure and the stateful hash-based cryptographic function of the signing device is switched off after generating and providing the requested hash-based signature.

By switching off between two signature request data structures protects the stateful hash-based cryptographic function from possible failures and attacks.

A second aspect concerns a monitoring apparatus for monitoring hash-based digital signatures, comprising
an interface unit configured to
receive a signature request data structure comprising data to be digitally signed from the requesting device,
store the data to be signed,
receive a hash-based digital signature generated for the data to be signed by a stateful hash-based cryptographic function of a signing device, and
a key evaluation unit configured to
extract a one-time signature from the received hash-based digital signature,
determine a one-time public key based on the stored data to be signed and the one-time signature,
compare the one-time public key with previous one-time public keys determined from hash-based digital signatures previously received from the signing device, and
if the one-time public key is different to any of previous one-time public keys, store the one-time public key in a data storage unit and forward the hash-based digital signature received to the requesting device, and
if the one-time public key is equal to at least one of the previous one-time public keys, output a first warning signal to the requesting device.

The monitoring apparatus provides protection of both the signing device and the requesting device against one-time secret key re-usage attacks. An attacker must tamper not only with the signing device but also with the monitoring device to succeed subverting the hash-based signature process. If the signature is verified by a verifier unit connected to the requesting device, the verifier unit is also protected from such an attack.

A third aspect concerns a method for monitoring hash-based digital signatures comprising receiving a signature request data structure comprising data to be digitally signed from the requesting device, storing the data to be signed, receiving a hash-based digital signature generated for the data to be signed by a stateful hash-based cryptographic function of the signing device, extracting a one-time signature from the received hash-based digital signature, determining a one-time public key based on the stored data to be signed and the one-time signature, comparing the one-time public key with previous one-time public keys determined from hash-based digital signatures previously received from the signing device, and if the one-time public key is different to any of previous one-time public keys, storing the one-time public key in a data storage unit and forward the hash-based digital signature received to the requesting device, and if the one-time public key is equal to any of the previous one-time public keys, outputting a first warning signal to the requesting device.

A fourth aspect concerns a computer program product (non-transitory computer readable storage medium having instructions, which when executed by a processor, perform actions) directly loadable into the internal memory of a digital computer, comprising software code portions for performing the steps as described before, when said product is run on said digital computer.

BRIEF DESCRIPTION

Figure 2:
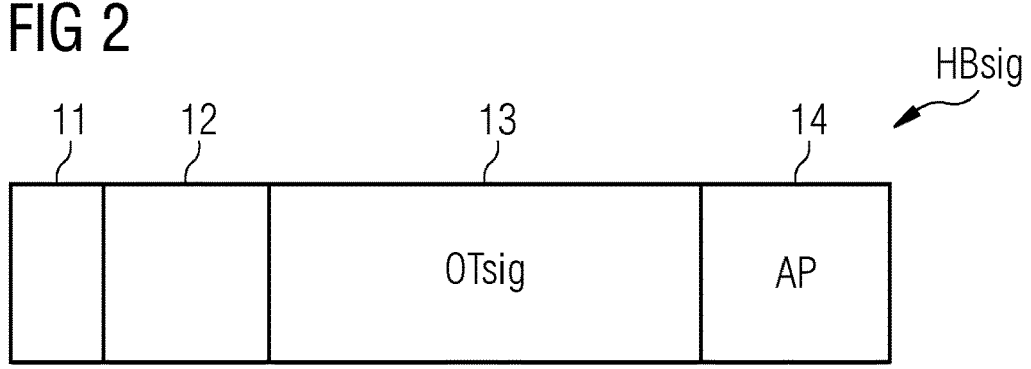
Figure 3:
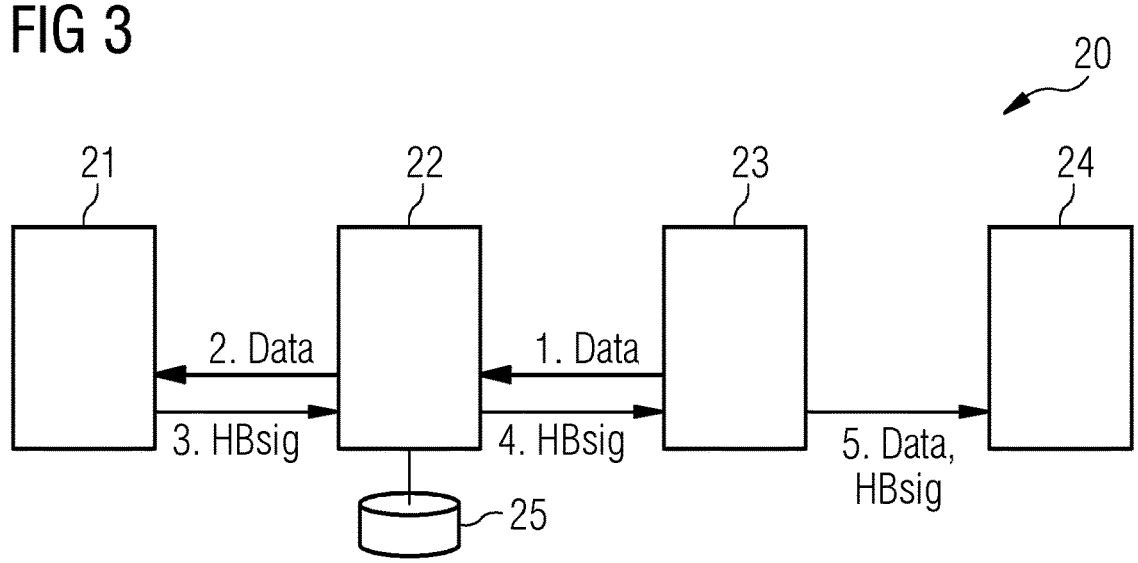
Figure 4:
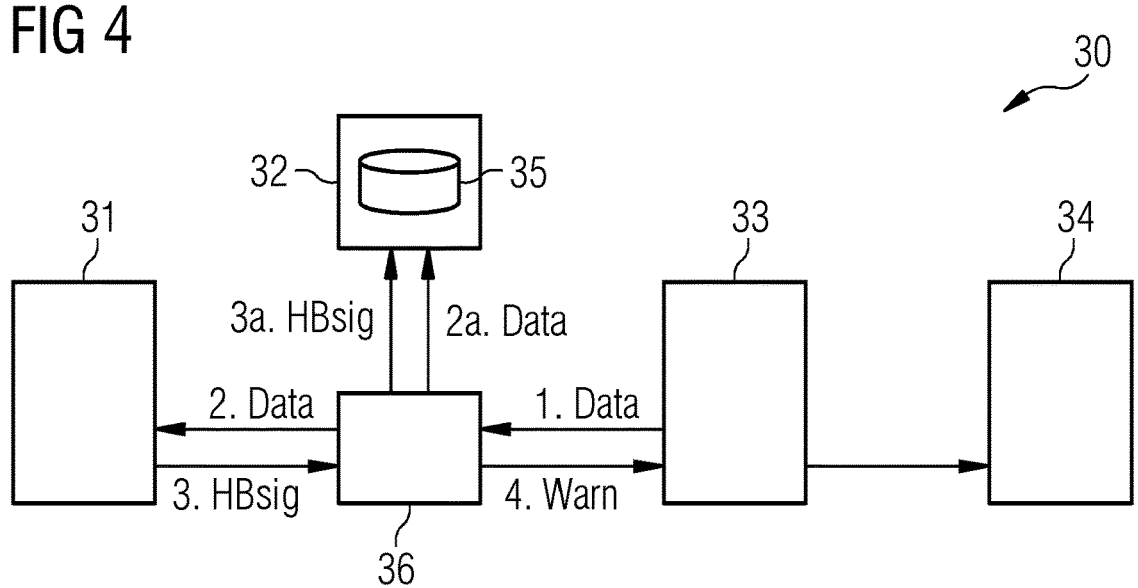
Figure 5:
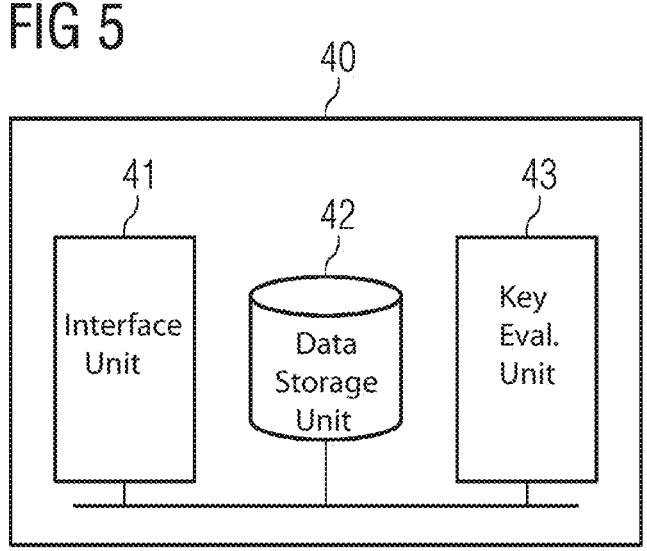
Figure 6:
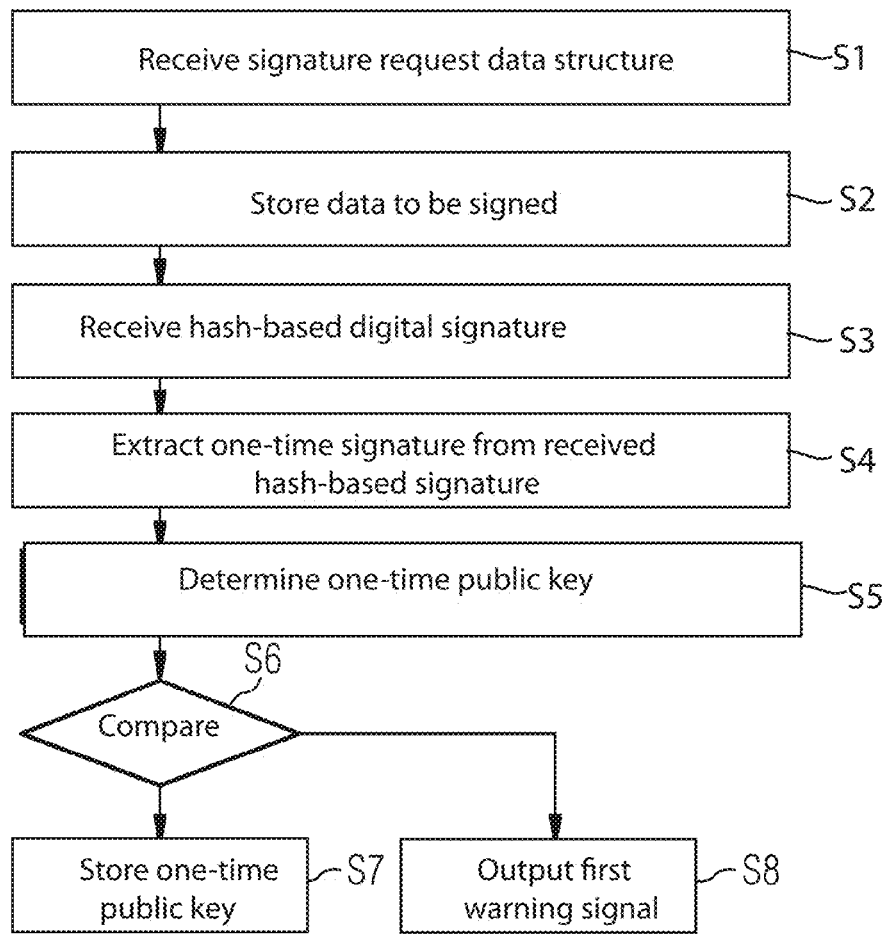

Some of the embodiments will be described in detail, with reference to the following figures, wherein like designations denote like members, wherein:

FIG. 1 schematically illustrates a signature scheme of a stateful hash-based digital cryptography;

FIG. 2 schematically illustrates a structure of a stateful hash-based digital signature;

FIG. 3 schematically illustrates a first embodiment of the inventive monitoring system configured to monitor hash-based digital signatures requested from a requesting device;

FIG. 4 schematically illustrates a second embodiment of the inventive monitoring system configured to monitor hash-based digital signatures requested from a requesting device;

FIG. 5 schematically illustrates an embodiment of the inventive monitoring apparatus configured to monitor hash-based digital signatures requested from a requesting device; and FIG. 6 shows an embodiment of the inventive method illustrated by a flow diagram.

DETAILED DESCRIPTION

It is noted that in the following detailed description of embodiments, the accompanying drawings are only schematic, and the illustrated elements are not necessarily shown to scale. Rather, the drawings are intended to illustrate functions and the co-operation of components. Here, it is to be understood that any connection or coupling of functional blocks, devices, components or other physical or functional elements could also be implemented by an indirect connection or coupling, e.g., via one or more intermediate elements. A connection or a coupling of elements or components or nodes can for example be implemented by a wire-based, a wireless connection and/or a combination of a wire-based and a wireless connection. Functional units can be implemented by dedicated hardware, e.g., processor, by firmware or by software, and/or by a combination of dedicated hardware and firmware and software. It is further noted that each functional unit described for an apparatus can perform a functional step of the related method.

FIG. 1 shows a structure of a stateful hash-based cryptography function, i.e., a stateful hash-based signature scheme. Hash-based signature schemes combine a one-time signature scheme OTSS with a Merkle tree structure MT. Since a one-time signature scheme key can only sign a single message, i.e., data to be signed, securely, it is practical to combine many such keys within a single, larger structure. A Merkle tree structure MT is used to this end. In this hierarchical data structure, a hash function and concatenation are used repeatedly to compute tree nodes.

In this way a one-time private key OTsk is uniquely used to generate a one-time signature OTsig, the one-time signature OTsig is uniquely tied to a one-time public key OTpk. A hash-based public key HBpk is determined based on all one-time signature schemes. The hash-based public key HBpk is published to verify all hash-based digital signatures generated based on one of the one-time private keys OTsk.

As an example, according to the eXtended Merkle Signature Scheme XMSS described in the RFC 8391, Winternitz plus (WOTS+) private keys are generated using a secret seed value and an index value. The index value is updated for every hash-based signature such that only unique WOTS+ private keys are generated. To guarantee the security of the XMSS cryptosystem, a signer generating the XMSS signature must guarantee that the index value is never used more than once. This can be achieved using a secure monotone counter, which can't be either decreased or reset. This is typically a very strong requirement which could be even circumvented in some cases, e.g., by modifying the counter during the signature computation after that the counter has been securely loaded from memory. There is no way for the XMSS verifier to check if the XMSS signer is behaving correctly. Leighton-Micali Signature (LMS) scheme is another approach to hash-based signatures described in the RFC 8554.

FIG. 2 shows the hash-based signature HBsig. The hash-based signature HBsig is a data structure consisting of several segments 11, 12, 13, 14. Segment 11 comprises an index of the one-time key pair, segment 12 comprises a randomized message hashing. In segment 13 the one-time signature OTsig is comprised. Segment 14 comprises a so-called authentication path AP for the used one-time key pair providing the nodes of the Merkle Tree required to calculate a so called root, which is the hash-based public key for all hash-based digital signatures 10 generated by one of the one-time private keys OTsk of the stateful hash-based signature scheme, see FIG. 1.

A monitoring system, monitoring apparatus and a method are based on the observation that one-time private keys OTsk are uniquely tied to their corresponding one-time public keys OTpk, one-time public keys OTpk are uniquely tied to one-time signatures OTsig, and one-time signatures OTsig are included within the hash-based signature HBsig. Since the one-time public keys OTpk can be computed out of one-time signatures OTsig, it is possible to indirectly verify if one-time secret keys OTsk were used multiple times by verifying if one-time public keys OTpk have been seen already.

FIG. 3 shows a monitoring system 20 comprising a signing device 21 having a stateful hash-base cryptographic function which is configured to output hash-based digital signatures HBsig generate by a stateful hash-based cryptographic function, and a requesting device 23, which requests for itself or a connected verifier device a hash-based digital signature HBsig from the signing device 21. To monitor the hash-based digital signatures with respect to being based on a unique, only one time applied one-time private key, a monitoring apparatus 22 is inserted in-between the signing device 21 and the requesting device 23 to inspect the hash-based digital signatures HBsig generated by the signing device 21. The monitoring apparatus 22 either allow or block the hash-based digital signature traffic depending on whether the one-time private keys OTsk are used only once or not, respectively. From the perspective of both the signing device 21 and the verifier device 24, the monitoring device 22 is fully transparent. No changes are required either to the signing device 21 nor to the verifier device 24 connected to the requesting device 23. The requesting device 23 requires specific adaptions only for receiving and processing a warning signal in case of a breach of a hash-based digital signature detected by the monitoring apparatus 22.

In a setup phase, the signing device 21 initialize a state of its stateful hash-based cryptographic function and generates a hash-based public key HBpk which is published, e.g., on the requesting device, and made accessible for any connected verifier device 24.

When data, e.g., an input message, must be signed, a signature request data structure is generated including the data to be signed, see data in FIG. 3, by the requesting device 23. The signature request data structure is sent to the monitoring apparatus 22, which forwards the signature request data structure to the signing device 21, see step 1 and 2. The signing device 21 generates a hash-based digital signature HBsig for the data to be signed using the using a current one-time secret key, e.g. generated using the current state information, and sends it back to the monitoring apparatus 22, see step 3. The monitoring apparatus 22 extracts the one-time signature OTsig from the hash-based digital signature HBsig, computes the one-time public key OTpk using the one-time signature OTsig and the data to be signed previously provided by the signature request data structure. The monitoring apparatus 22 verifies whether the one-time public key OTpk is already present in a data storage unit 25. The data storage unit 25 can be an integral part of or attached to the monitoring apparatus 22. The data storage unit 25 is protected with respect to data integrity. Integrity protection can be assured by digitally signing the content of the storage unit or by storing the date in a blockchain or in a Merkle tree.

If the one-time public key OTpk was not present in the data storage unit 25, it is added to the data storage unit 25. The monitoring apparatus 22 forwards the hash-based digital signature HBsig to the verifier device, see step 4.

The verifier device 24 receives the hash-based digital signature HBsig and the data to be signed, see step 5, and verifies if the hash-based digital signature HBsig of the data to be signed is valid using the hash-based public key HBpk published in the setup phase. If the one-time public key OTpk was already present in the data storage unit 25, a first alarm is raised, and defined measures are applied.

In an embodiment the monitoring apparatus 22 and the requesting device 23 are comprised in a first communication network and the signing device 21 is comprised it a second communication network, wherein the first communication network is different from the second communication network. In this scenario the monitoring apparatus 22 provides a gateway and/or a firewall function blocking invalid hash-based signatures received from the second communication network.

FIG. 4 shows a monitoring system 30 in an alternative communication environment. Monitoring system 30 comprises a signing device 31, a monitoring apparatus 32, a requesting device 33 and at least one verifier device 34 connected to the requesting device 33. In this environment the data to be signed are provided to the signing device 31 without passing through the monitoring apparatus 32. Similarly, the generated hash-based digital signature HBsig may not be passed through the monitoring device 32. In this environment the data to be signed and the generated hash-based digital signature HBsig are transferred to the monitoring apparatus 32 via a transfer device 35, see steps 2a, 3a in FIG. 4. The monitoring apparatus 32 stores the data to be signed received from the transfer device 35.

When the generated hash-based digital signature HBsig is received from the transfer device 35, the monitoring device 32 extract a one-time signature OTsig from the received hash-based digital signature HBsig, determines a one-time public key OTpk based on the stored data to be signed and the one-time signature OTsig and compares the one-time public key OTpk with previous one-time public keys determined from hash-based digital signatures previously received from the signing device 31. If the one-time public key OTpk is different to any of previous one-time public keys the monitoring apparatus stores the one-time public key in a data storage unit. The data storage unit is assumed to be part of the monitoring unit 32. In some embodiments, the monitoring apparatus outputs a release indicator indicating that the hash-based digital signature HBsig is valid. On receipt of the release indicator the transfer device 35 forwards the hash-based digital signature HBsig to the requesting device 33. Alternatively, the requesting device 33 forwards the hash-based digital signature HBsig on receipt of the release indicator to the verifier device 34.

If the one-time public key OTpk is equal to at least one of the previous one-time public keys, the monitoring apparatus 32 outputs a first warning signal via the transfer device 35 to the requesting device 33, see step 4.

In an embodiment the stateful hash-based cryptographic function of the signing device 21, 31 is switched on when receiving a signature request data structure and the stateful hash-based cryptographic function of the signing device is switched off after generating and providing the requested hash-based signature. All communication required for signing is handed over the monitoring apparatus 22, 32. When a hash-based digital signature HBsig is requested, the monitoring apparatus 22, 32 switches on the signing device 21, 31. When signing device 21, 31 has generated the hash-based digital signature HBsig, then it can be switched off again. This protects the signing device 21, 31 from possible failures and attacks.

The communication among the signing device 21, 31, the monitoring apparatus 22, 32, the requesting device 23, 33 and the transfer device 35 is encrypted. All parties named above are mutually authenticated.

FIG. 5 shows an embodiment of a monitoring apparatus 40 in more detail. The monitoring apparatus 40 comprises an interface unit 41, a data storage unit 42 and a key evaluation unit 43. The interface unit 41 is configured to receive the signature request data structure comprising data to be digitally signed and to store the data to be signed. The interface unit 41 is configured to receive the signature request data structure either from a transfer device or a requesting device. The interface unit 41 is further configured to receive a hash-based digital signature generated for the data to be signed by a stateful hash-based cryptographic function of a signing device.

The key evaluation unit 43 configured to extract a one-time signature OTsig from the received hash-based digital signature HBsig, and to determine a one-time public key OTpk based on the stored data to be signed and the one-time signature OTsig. The key evaluation unit compares the one-time public key OTpk with previous one-time public keys determined from hash-based digital signatures previously received from the signing device. If the one-time public key OTpk is different to any of previous one-time public keys, the one-time public key OTpk is stored in the data storage unit 42.

If the one-time public key OTpk is equal to at least one of the previous one-time public keys stored in the data storage unit 42, the key evaluation unit 43 is configured to output a first warning signal to a requesting device. In some embodiments, the hash-based digital signature is blocked and not forwarded to the requesting device.

In an embodiment the monitoring apparatus 40 outputs the first warning signal to the requesting device, only if all further hash-based signatures of a predefined number of further hash-based signatures received for the data to be signed are equal to any of the previous one-time public keys. This means, after having detected a one-time private key OTsk re-usage, the monitoring apparatus 40 does not raise the first alarm immediately but informs the signing device about the unexpected behaviour. The signing device can try recovering from its error state and generate a hash-based digital signature HBsig using the next one-time private key OTsk available. This process can be repeated multiple times. If the signing device continuously fails to provide a valid hash-based digital signature HBsig, then the monitoring apparatus 40 finally outputs the first alarm signal.

In some embodiments, the monitoring apparatus 40 is configured to send a second warning signal to the signing device, if the one-time public key OTpk is equal to any of the previous public keys. On receipt of the second warning signal, the signing device generates a further hash-based signature for the data to be signed.

The first and second warning signal is either send directly to the requesting device and the signing device respectively, depending on the communication environment, see FIGS. 3 and 4.

The monitoring apparatus stores additional meta-information of the signing request data structure and/or the meta-information of the hash-based digital signature. Meta-information is, e.g., local and time information, identifiers. The meta-information is stored together with one-time public keys in the data storage unit 42. This meta-information may be used to implement further security checks on the monitoring apparatus 40.

The monitoring apparatus 22, 32, 40 can be part of a monitoring system or a stand-alone monitoring apparatus. All features of the monitoring apparatus when part of the monitoring system are also incorporated in a stand-alone monitoring apparatus and vice versa.

FIG. 6 illustrates the method for monitoring hash-based digital signatures as a flow chart. In a first method step S1 a signature request data structure comprising data to be digitally signed is received from the requesting device. In a second step S2 the data to be signed are stored. After receiving a hash-based digital signature generated for the data to be signed by a stateful hash-based cryptographic function of the signing device, see step S3, a one-time signature is extracted from the received hash-based digital signature, see step S4. A one-time public key is determined based on the stored data to be signed and the one-time signature, see step S5 and the one-time public key is compared with previous one-time public keys determined from hash-based digital signatures previously received from the signing device, see S6.

If the one-time public key is different to any of previous one-time public keys, the one-time public key is stored in a data storage unit, see step S7. If the one-time public key is equal to at least one of the previous one-time public keys, a first warning signal is output to the requesting device in step 8.

The monitoring system and method applying a monitoring apparatus have the advantage, that an attacker must tamper both the signing device and the monitoring apparatus to succeed subverting the hash-based signature process. Avoiding one-time private key re-usage is fundamental to guarantee the security of the signature system. The signing device and the monitoring apparatus can be implemented by different companies and can be located in different regions. There is no need for the signing device to implement expensive self-checking mechanisms for the internal state management and one-time private key generation. The security is further guaranteed from the monitoring apparatus. The monitoring apparatus can be a more powerful computer than the signing device which can additionally implements further security checks on the generated signatures, e.g., plausibility checks.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A monitoring system comprising one or more processors, for monitoring hash-based digital signatures comprising:
   a requesting device comprising one or more processors, a monitoring apparatus comprising one or more processors, and a signing device comprising one or more processors, wherein the monitoring apparatus is configured to:
   receive a signature request data structure comprising data to be digitally signed from the requesting device;
   store the data to be signed;
   receive a hash-based digital signature generated for the data to be signed by a stateful hash-based cryptographic function of the signing device;
   extract a one-time signature from the received hash-based digital signature;
   determine a one-time public key based on the stored data to be signed and the one-time signature;
   compare the one-time public key with previous one-time public keys determined from hash-based digital signatures previously received from the signing device; and
   if the one-time public key is different to any of previous one-time public keys, store the one-time public key in a data storage unit;

if the one-time public key is equal to at least one of the previous one-time public keys, output a first warning signal to the requesting device.

2. The monitoring system according to claim 1, wherein the hash-based digital signature is blocked and not forwarded to the requesting device, if the one-time public key is equal to any of the previous public keys.

3. The monitoring system according to claim 1, wherein the monitoring apparatus is configured to send a second warning signal to the signing device, if the one-time public key is equal to any of the previous public keys.

4. The monitoring system according to claim 3, wherein on receipt of the second warning signal, the signing device generates a further hash-based signature for the data to be signed.

5. The monitoring system according to claim 1, wherein the monitoring apparatus outputs the first warning signal to the requesting device, only if all further hash-based signatures of a predefined number of further hash-based signatures received for the data to be signed are equal to any of the previous one-time public keys.

6. The monitoring system according to claim 1, wherein the data storage unit is protected with respect to data integrity.

7. The monitoring system according to claim 1, wherein the monitoring apparatus stores additional meta-information of the signing request data structure and/or the meta-information of the hash-based digital signature.

8. The monitoring system according to claim 1, wherein the monitoring apparatus forwards the signature request data structure to the signing device, and/or forward the monitoring apparatus forwards the hash-based digital signature received from the signing device to the requesting device.

9. The monitoring system according to claim 1, wherein the signature request data structure is provided to the signing device without passing the monitoring apparatus and the monitoring apparatus receives the data to be signed and the hash-based digital signature generated for the data to be signed from a transfer device.

10. The monitoring system according to claim 5, wherein the monitoring apparatus and the requesting device are comprised in a first communication network and the signing device is comprised in a second communication network, wherein the first communication network is different from the second communication network.

11. The monitoring system according to claim 1, wherein the signing device initializes an internal state with respect to a set of one-time private keys of the stateful hash-based cryptographic function and generates a hash-based public key based on the initial internal state, and provides the hash-based public key to verify the generated hash-based digital signature.

12. The monitoring system according to claim 1, wherein the stateful hash-based cryptographic function of the signing device is switched on when receiving a signature request data structure and the stateful hash-based cryptographic function of the signing device is switched off after generating and providing the requested hash-based signature.

13. A monitoring apparatus comprising one or more processors, for monitoring hash-based digital signatures, comprising:
    an interface unit implemented by the one or more processors of the monitoring apparatus configured to:
    receive a signature request data structure comprising data to be digitally signed from a requesting device comprising one or more processors;
    store the data to be signed;
    receive a hash-based digital signature generated for the data to be signed by a stateful hash-based cryptographic function of a signing device comprising one or more processors; and
    the one or more processors of the monitoring apparatus further configured to:
    extract a one-time signature from the received hash-based digital signature;
    determine a one-time public key based on the stored data to be signed and the one-time signature;
    compare the one-time public key with previous one-time public keys determined from hash-based digital signatures previously received from the signing device: and
    if the one-time public key is different to any of previous one-time public keys, store the one-time public key in a data storage unit, and
    if the one-time public key is equal to at least one of the previous one-time public keys, output a first warning signal to the requesting device.

14. A method for monitoring hash-based digital signatures comprising:
    receiving a signature request data structure comprising data to be digitally signed from a requesting device;
    storing the data to be signed;
    receiving a hash-based digital signature generated for the data to be signed by a stateful hash-based cryptographic function of a signing device;
    extracting a one-time signature from the received hash-based digital signature;
    determining a one-time public key based on the stored data to be signed and the one-time signature;
    comparing the one-time public key with previous one-time public keys determined from hash-based digital signatures previously received from the signing device; and
    if the one-time public key is different to any of previous one-time public keys, storing the one-time public key in a data storage unit, and
    if the one-time public key is equal to at least one of the previous one-time public keys, outputting a first warning signal to the requesting device.

15. A computer program product, comprising a computer readable hardware storage device having computer readable program code stored therein, said program code executable by a processor of a computer system to implement a method of claim 14 when the product is run on the computer system.

* * * * *